US008732713B2

(12) United States Patent
Coon et al.

(10) Patent No.: US 8,732,713 B2
(45) Date of Patent: May 20, 2014

(54) THREAD GROUP SCHEDULER FOR COMPUTING ON A PARALLEL THREAD PROCESSOR

(75) Inventors: Brett W. Coon, San Jose, CA (US); John R. Nickolls, Los Altos, CA (US); Kathleen Elliott Nickolls, legal representative, Los Altos, CA (US); John Erik Lindholm, Saratoga, CA (US); Robert J. Stoll, Los Altos, CA (US); Nicholas Wang, Saratoga, CA (US); Jack Hilaire Choquette, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 281 days.

(21) Appl. No.: 13/247,819

(22) Filed: Sep. 28, 2011

(65) Prior Publication Data
US 2012/0110586 A1    May 3, 2012

Related U.S. Application Data

(60) Provisional application No. 61/387,911, filed on Sep. 29, 2010.

(51) Int. Cl.
*G06F 9/46* (2006.01)
(52) U.S. Cl.
USPC ........................................................ 718/102
(58) Field of Classification Search
USPC ........................................................ 718/102
See application file for complete search history.

(56) References Cited

U.S. PATENT DOCUMENTS

| 7,366,878 | B1 * | 4/2008 | Mills et al. ..................... 712/214 |
| 7,526,634 | B1 * | 4/2009 | Duluk et al. .................. 712/216 |
| 2004/0019891 | A1 * | 1/2004 | Koenen ......................... 718/102 |
| 2011/0276973 | A1 * | 11/2011 | Chung et al. .................. 718/103 |

OTHER PUBLICATIONS

Erik Lindholm, John Nickolls, Stuart Oberman, John Montrym, Nvidia Tesla: A Unified Graphics and Computing Architecture, Mar.-Apr. 2008, IEEE Micro, p. 39-55.*

Bingsheng He, Wenbin Fang, Qiong Luo, Naga K. Govindaraju, Tuyong Wang, Mars: A MapReduce Framework on Graphics Processors, PACT'08, Oct. 25-29, 2008, Toronto, Ontario, Canada, p. 260-269.*

George L. Yuan, Ali Bakhoda, Tor M. Aamodt, Complexity Effective Memory Access Scheduling for Many-Core Accelerator Architectures, MICRO'09, Dec. 12-16, 2009, New York, NY, USA, p. 34-44.*

* cited by examiner

*Primary Examiner* — Emerson Puente
*Assistant Examiner* — Charlie Sun
(74) *Attorney, Agent, or Firm* — Patterson & Sheridan, LLP

(57) ABSTRACT

A parallel thread processor executes thread groups belonging to multiple cooperative thread arrays (CTAs). At each cycle of the parallel thread processor, an instruction scheduler selects a thread group to be issued for execution during a subsequent cycle. The instruction scheduler selects a thread group to issue for execution by (i) identifying a pool of available thread groups, (ii) identifying a CTA that has the greatest seniority value, and (iii) selecting the thread group that has the greatest credit value from within the CTA with the greatest seniority value.

20 Claims, 7 Drawing Sheets

THREAD GROUP SCHEDULER FOR COMPUTING ON A PARALLEL THREAD PROCESSOR

CROSS-REFERENCE TO RELATED APPLICATIONS

This application claims the benefit of U.S. provisional patent application titled "Warp Scheduler for Computing on a Parallel Thread Processor," filed on Sep. 29, 2010, and having Ser. No. 61/387,911.

BACKGROUND OF THE INVENTION

1. Field of the Invention

The present invention generally relates to parallel processing and more specifically to a thread group scheduler for computing on a parallel thread processor.

2. Description of the Related Art

A "thread group" is a set of parallel threads that execute the same instruction together in a single-instruction multiple-thread (SIMT) or single-instruction multiple-data (SIMD) fashion. A typical multithreaded streaming multiprocessor (SMP) schedules two sets of 24 thread groups, where each thread group has 32 parallel threads. The SMP schedules thread groups that are ready to execute an instruction and dispatches and executes each thread group instruction. The SMP can schedule two different thread groups for each SMP cycle.

Compute Unified Device Architecture (CUDA), Open Computing Language (OpenCL), and DirectX 11 (DX11) are computing programs that execute parallel threads on an SMP in groups of related threads known as "cooperative thread arrays" (CTAs). A CTA is a set of concurrently executing threads that can cooperate, synchronize, communicate, and share memory. The SMP implements a CTA as one or more thread groups, and can schedule and execute multiple CTAs concurrently. When executing multiple CTAs, the threads comprising each CTA must synchronize at specific "barrier" points and at CTA completion. When a given CTA completes, the resources allocated to that CTA are freed. The SMP may then launch additional CTAs.

Conventional SMPs attempt to schedule thread groups "fairly" so that each thread group makes equal progress compared to the other thread groups. Prior techniques may be effective when the SMP executes just one CTA. However, various problems arise when the SMP executes multiple CTAs.

First, if one thread of an executing CTA requires more time to reach a barrier point than other threads within that CTA, then the other threads within the CTA must wait for that one thread to complete. In this situation, the other CTAs are ineligible to execute additional instructions and cannot help hide the execution latency of the one remaining thread. Further, the SMP may be unable to start a new CTA until the last thread of the executing CTA is finished, even though the SMP may have sufficient per-thread resources at least partially unused by the executing CTA.

Second, thread groups within an executing CTA often perform similar processing operations at similar times, and so those thread groups often require the same resources almost simultaneously. This situation may result in a resource conflict between those thread groups. For example, if every thread group within the executing CTA needed to perform a math operation at the same time, then those thread groups may become bottlenecked on the math resource.

Third, when multiple CTAs are launched simultaneously within an SMP, those CTAs often exit nearly simultaneously, which may leave the SMP sitting idle until the CTA resources are reclaimed and new CTAs are launched. In practice, the process of reclaiming resources and launching new CTAs may take many tens of cycles, depending on the size of the CTA. During those cycles, the SMP may sit idle.

Finally, a conventional SMP may repeatedly allocate all execution resources to a single high-priority CTA while excluding other low-priority CTAs from being scheduled, thereby preventing the low-priority CTAs from completing. In situations where the high-priority CTA depends on the completion of the low-priority CTAs, deadlock may occur because the low-priority CTAs cannot complete without the resources held by the high-priority CTA.

Accordingly, what is needed in the art is an improved technique for scheduling thread groups for execution.

SUMMARY OF THE INVENTION

Embodiments of the invention include a computer-implemented method for scheduling thread groups for execution on a parallel thread processor configured to process multiple cooperative thread arrays (CTAs). The method includes identifying a pool of thread groups that are available to be issued for execution on the parallel thread processor and identifying a first CTA based on a seniority value associated with the first CTA that reflects an amount of time elapsed since the first CTA was launched. The method also includes selecting from within the first CTA a first thread group to be issued for execution on the parallel thread processor based on a credit value associated with the first thread group that reflects an amount of processing operations completed by the first thread group.

One advantage of the invention is that multiple CTAs can be launched within the parallel thread processor simultaneously, while various processing inefficiencies are avoided.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
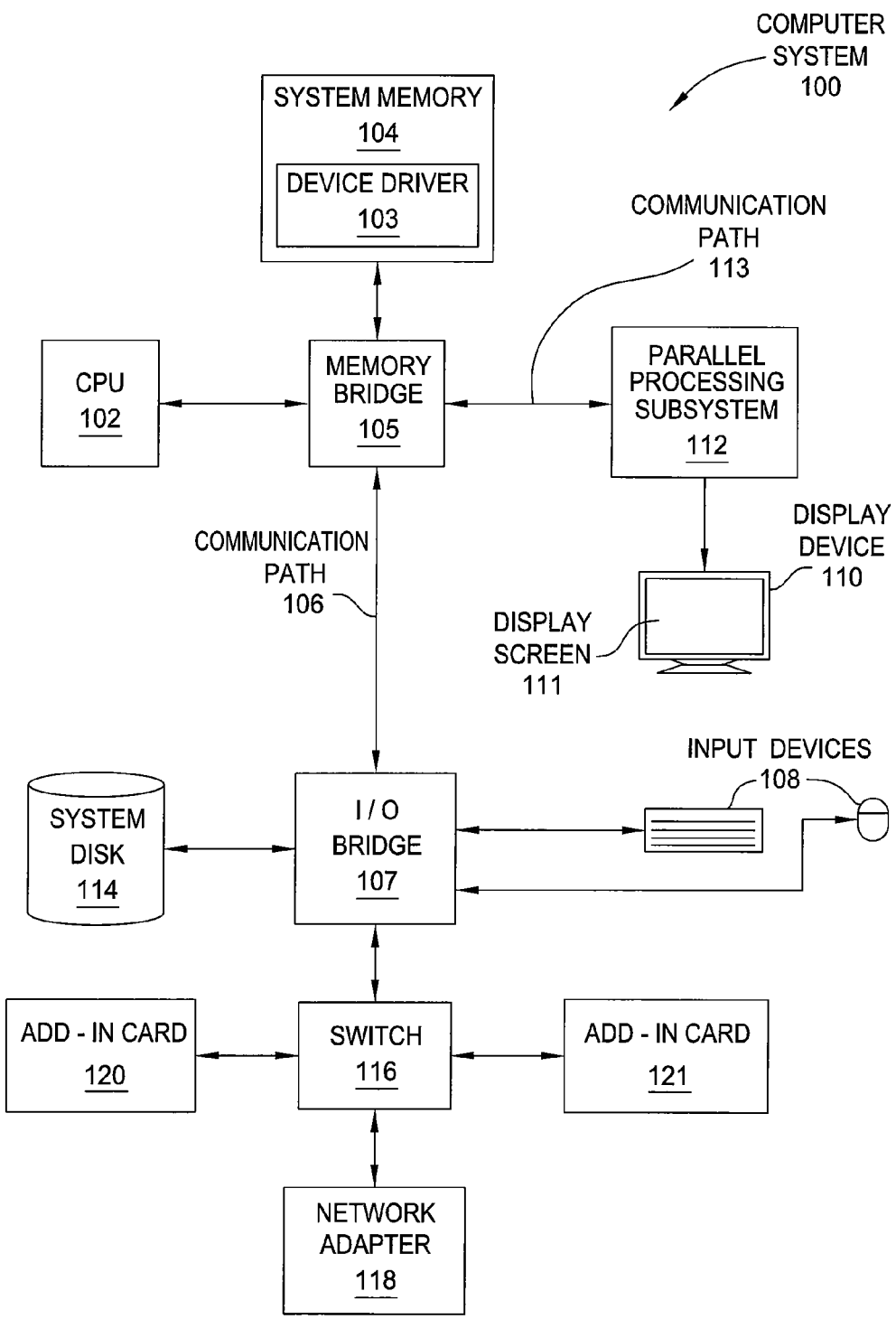
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 that includes a device driver 103. CPU 102 and system memory 104 communicate via an interconnection path that may include a memory bridge 105. Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a peripheral component interconnect (PCI) express, Accelerated Graphics Port (AGP), or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. Communication paths interconnecting the various components in FIG. 1 may be implemented using any suitable protocols, such as PCI, PCI Express (PCIe), AGP, Hyper-Transport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
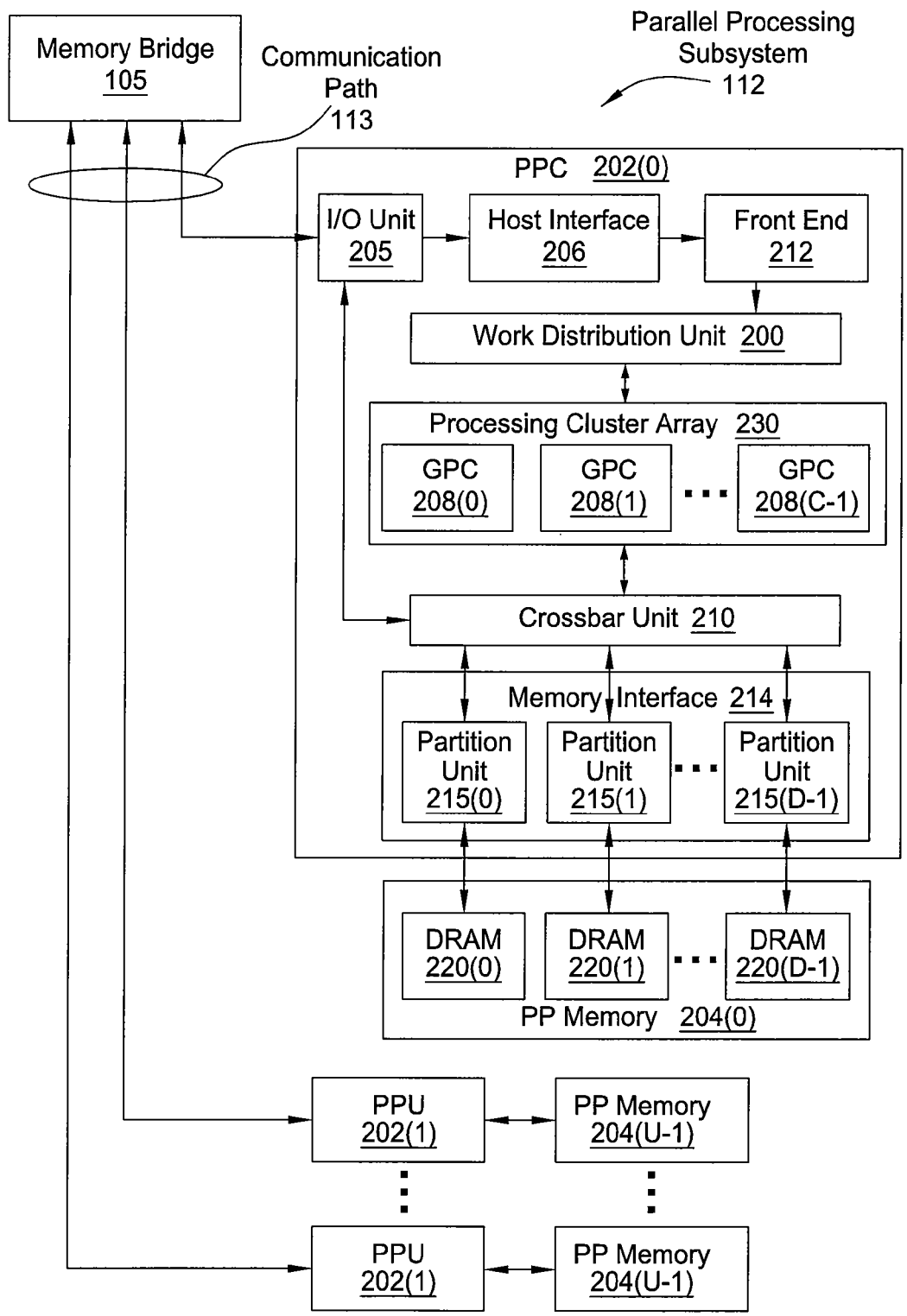
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device (s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that dynamic random access memories (DRAMs) 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCIe) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
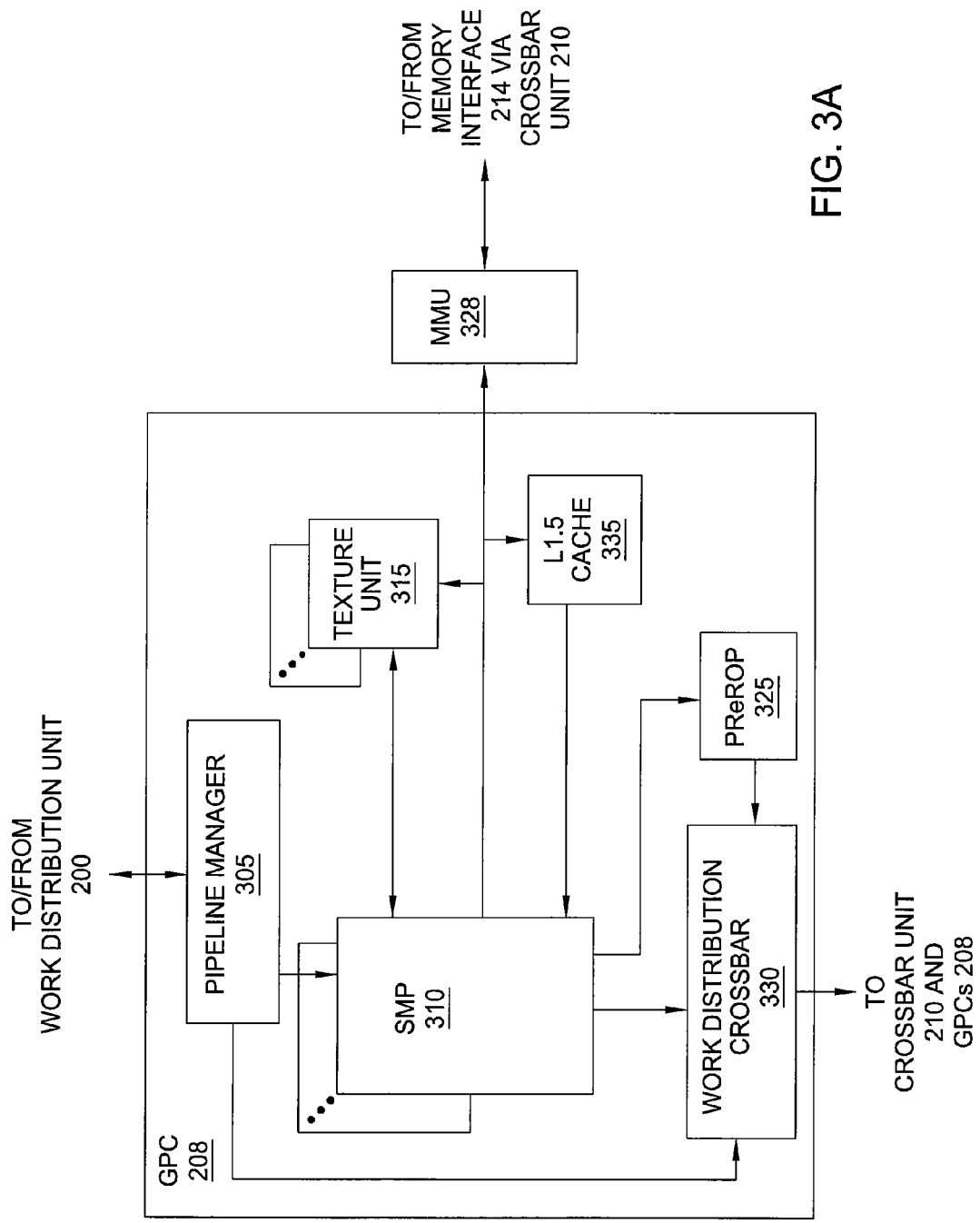
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SMPs) 310. Pipeline manager 305 may also be configured to control a work distribution crossbar 330 by specifying destinations for processed data output by SMPs 310.

In one embodiment, each GPC 208 includes a number M of SMPs 310, where M≥1, each SMP 310 configured to process one or more thread groups. Also, each SMP 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SMP 310 is referred to herein as a "thread group." As used herein, a "thread group" refers to a group of threads concurrently executing the same program on different input data, with one thread of the group being assigned to a different processing engine within SMP 310. A thread group may include fewer threads than the number of processing engines within the SMP 310, in which case some processing engines will be idle during cycles when that thread group is being processed. A thread group may also include more threads than the number of processing engines within the SMP 310, in which case processing will take place over consecutive clock cycles. Since each SMP 310 can support up to G thread groups concurrently, it follows that up to G*M thread groups can be executing in GPC 208 at any given time.

Additionally, a plurality of related thread groups may be active (in different phases of execution) at the same time within an SMP 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SMP 310, and m is the number of thread groups simultaneously active within the SMP 310. The size of a CTA is generally determined by the programmer and the amount of hardware resources, such as memory or registers, available to the CTA.

Each SMP 310 contains an L1 cache (not shown) or uses space in a corresponding L1 cache outside of the SMP 310 that is used to perform load and store operations. Each SMP 310 also has access to L2 caches within the partition units 215 that are shared among all GPCs 208 and may be used to transfer data between threads. Finally, SMPs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SMP 310, including instructions, uniform data, and constant data, and provide the requested data to SMP 310. Embodiments having multiple SMPs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SMP 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SMP 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SMP 310 and is fetched from an L2 cache, parallel processing memory 204, or system memory 104, as needed. Each SMP 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SMP 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMPs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
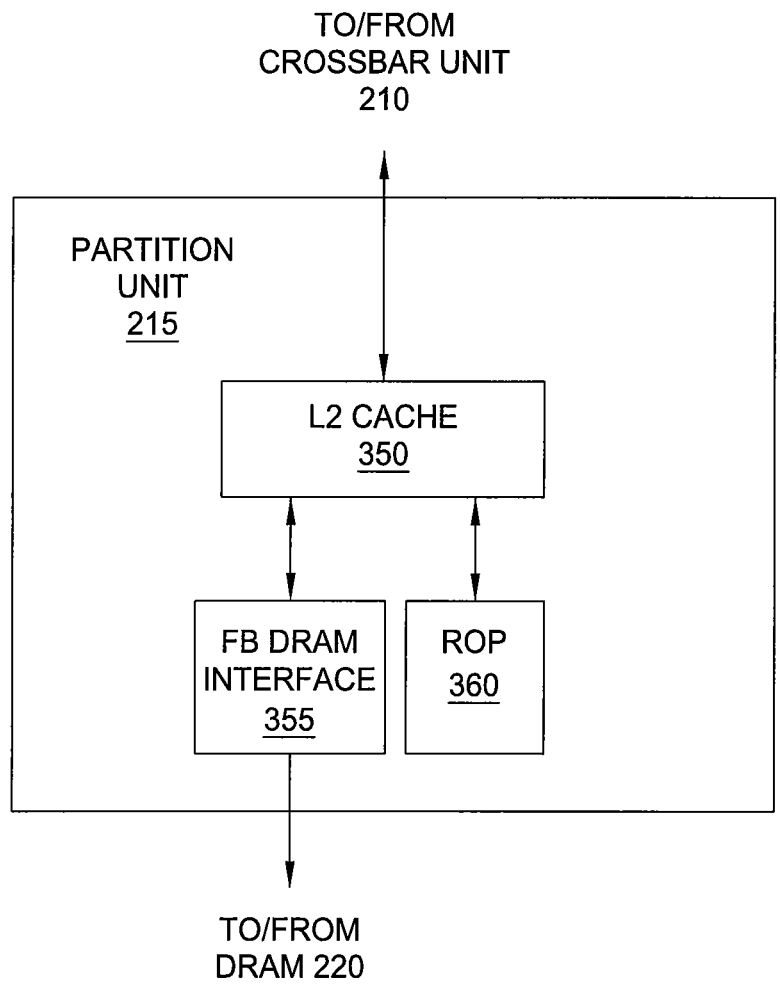
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
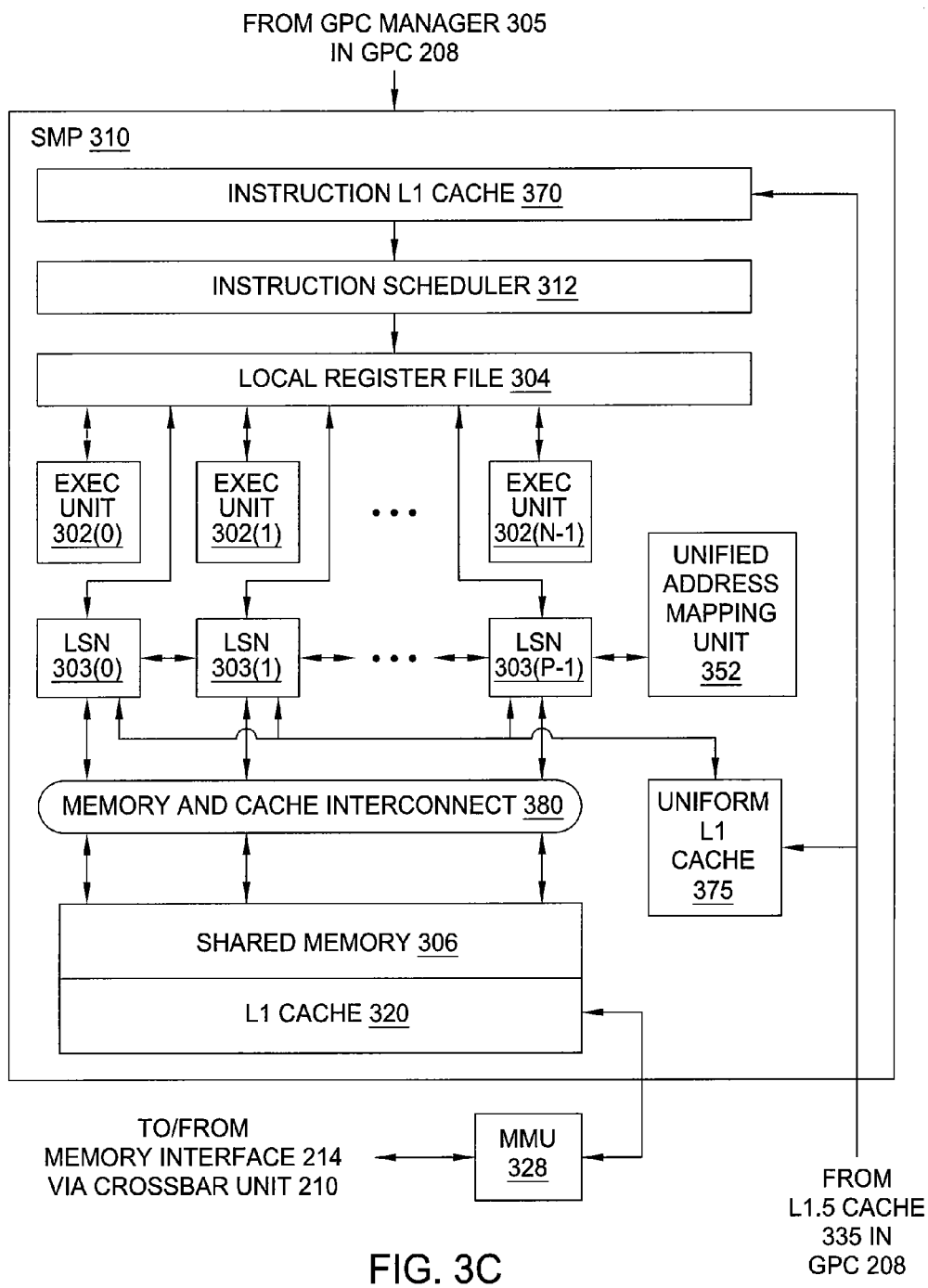
FIG. 3C is a block diagram of a portion of the SMP of FIG. 3A, according to one embodiment of the present invention.

FIG. 3C is a block diagram of the SMP 310 of FIG. 3A, according to one embodiment of the present invention. The SMP 310 includes an instruction L1 cache 370 that is configured to receive instructions and constants from memory via L1.5 cache 335. An instruction scheduler 312 receives instructions and constants from the instruction L1 cache 370 and controls local register file 304 and SMP 310 functional units according to the instructions and constants. The SMP 310 functional units include N exec (execution or processing) units 302 and P load-store units (LSU) 303. The instruction scheduler 312 is configured to schedule thread groups belonging to one or more different CTAs for execution by the exec units 302. The instruction scheduler 312 may cause each of the N exec units 302 to execute a different one of N threads belonging to a given thread group.

As described in greater detail below in conjunction with FIGS. 4 and 5, the instruction scheduler 312 performs a series of processing steps at each cycle of the SMP 310 in order to identify a particular thread group to issue for execution during the subsequent cycle. First, the instruction scheduler 312 identifies the thread groups that are currently available to issue. A particular thread group may not be available to issue when that thread group has been stalled by, e.g., a hardware-imposed latency, a math or memory latency, or a synchronization latency, as discussed in greater detail below in conjunction with FIG. 4.

Once a pool of available thread groups has been identified, the instruction scheduler 312 sorts the available thread groups based on a "seniority" value associated with the CTA to which each thread group belongs. As referred to herein, the seniority value of a given CTA may refer to the amount of time elapsed since the CTA was initially launched (i.e., the "age" of that CTA). However, as further discussed below in conjunction with FIG. 5, the seniority value of a CTA may be increased or decreased by the instruction scheduler 312, and, thus, may not necessarily reflect the actual age of that CTA.

The instruction scheduler 312 identifies the CTA that has the greatest seniority value and then sorts the thread groups within that CTA based on a credit value associated with each thread group. The credit value associated with a given thread group reflects the progress of the threads within the thread group towards completing the processing tasks assigned to those threads, as also discussed in greater detail below in conjunction with FIG. 5. The instruction scheduler 312 selects the thread group with the highest credit value, and then issues that thread group for execution during the subsequent cycle. At the subsequent cycle, the SMP 310 executes the threads within the selected thread group using the exec units 302 and the LSUs 303, as well as various different memory units within the SMP 310 and/or external to the SMP 310.

SMP 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SMP 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SMP 310 to begin execution of a CTA that uses these parameters. Any CTA thread within any CTA (or any exec unit 302 within SMP 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one or more of the special registers.

Shared memory 306 is accessible to all CTA threads (within a single CTA); any location in shared memory 306 is accessible to any CTA thread within the same CTA (or to any processing engine within SMP 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SMP 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SMP 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Thread Group Scheduling

As described above in conjunction with FIG. 3C, instruction scheduler 312 selects a particular thread group for execution based on (i) the availability of the thread group, (ii), the seniority value of the CTA to which the thread group belongs, and (iii) an amount of credit associated with the thread group.

Figure 4:
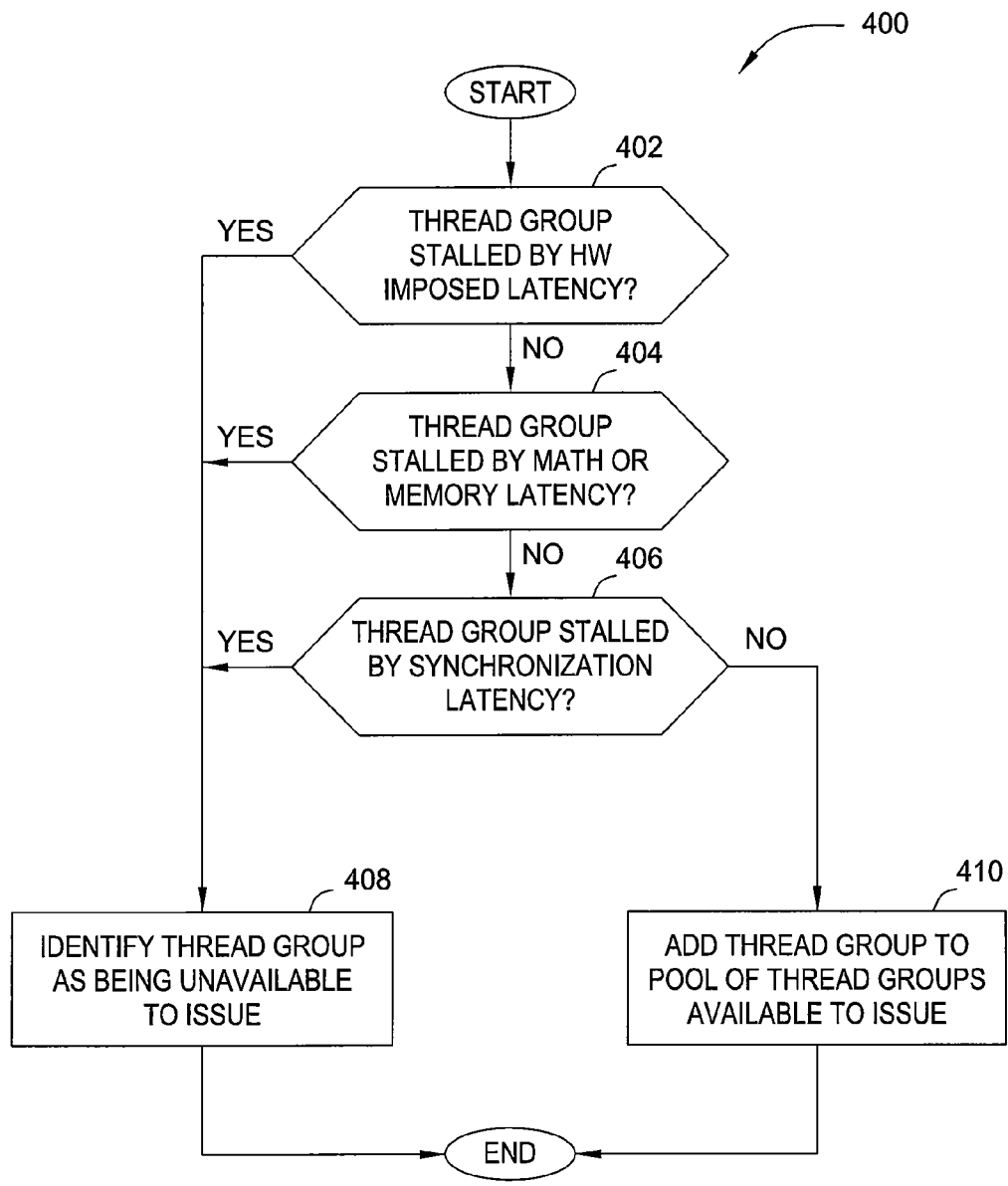
FIG. 4 is a flowchart of method steps for determining whether a thread group is available to issue for execution, according to one embodiment of the invention.

FIG. 4 is a flowchart of method steps for determining whether a thread group is available to issue for execution, according to one embodiment of the invention. By implementing the method 400 repeatedly for each thread group associated with the various CTAs currently launched within the SMP 310, the instruction scheduler 312 may identify a pool of thread groups that are available to issue for execution. Persons skilled in the art will understand that, although the method 400 is described in conjunction with the systems of FIG. 1-3C, any system configured to perform the method steps, in any order, is within the scope of the present invention.

As shown, the method 400 begins at step 402, where the instruction scheduler 312 determines whether the thread group is stalled by a hardware-imposed latency. A hardware-imposed latency may occur for a particular thread group when the instruction scheduler 312 determines the various constraints associated with that thread group, which may require one or more cycles. During that time, the thread group is not yet available to issue for execution. A hardware-imposed latency may also occur for a given thread group depending on the availability of an execution unit required by that thread group. At step 402, if the instruction scheduler 312 determines that the thread group is stalled by a hardware-imposed latency, then the method 400 proceeds to step 408, and the thread group is identified as being unavailable to issue. If the instruction scheduler 312 determines at step 402 that the thread group is not stalled by a hardware-imposed latency, then the method 400 proceeds to step 404.

At step 404, the instruction scheduler 312 determines whether the thread group is stalled by a math or memory latency. A math latency may occur when the thread group is performing mathematical computations within, e.g., exec units 302. A memory latency may occur when the thread group awaits completion of read and/or write requests performed by, e.g., LSUs 303. At step 404, if the instruction scheduler 312 determines that the thread group is stalled by a math or memory latency, the method 400 proceeds to step 408, and the thread group is identified as being unavailable to issue. If the instruction scheduler 312 determines at step 404 that the thread group is not stalled by a math or memory latency, then the method 400 proceeds to step 406.

At step 406, the instruction scheduler 312 determines whether the thread group is stalled by a synchronization latency. A synchronization latency may occur when one or more threads within the thread group have reached a synchronization barrier, while one or more other threads within the thread group have not yet reached the synchronization barrier.

The threads at the synchronization barrier must wait until the other threads in the thread group have progressed to the synchronization barrier. At step 406, if the instruction scheduler 312 determines that the thread group is stalled by a synchronization latency, the method 400 proceeds to step 408, and the thread group is identified as being unavailable to issue. If the instruction scheduler 312 determines at step 406 that the thread group is not stalled by a synchronization latency, then the method 400 proceeds to step 410.

At step 410, the instruction scheduler adds the thread group to a pool of thread groups that are available to issue during the subsequent cycle. As discussed in greater detail below in conjunction with FIG. 5, upon identifying a pool of available thread groups, the instruction scheduler sorts the pool and selects a thread group to issue during the subsequent cycle.

Figure 5:
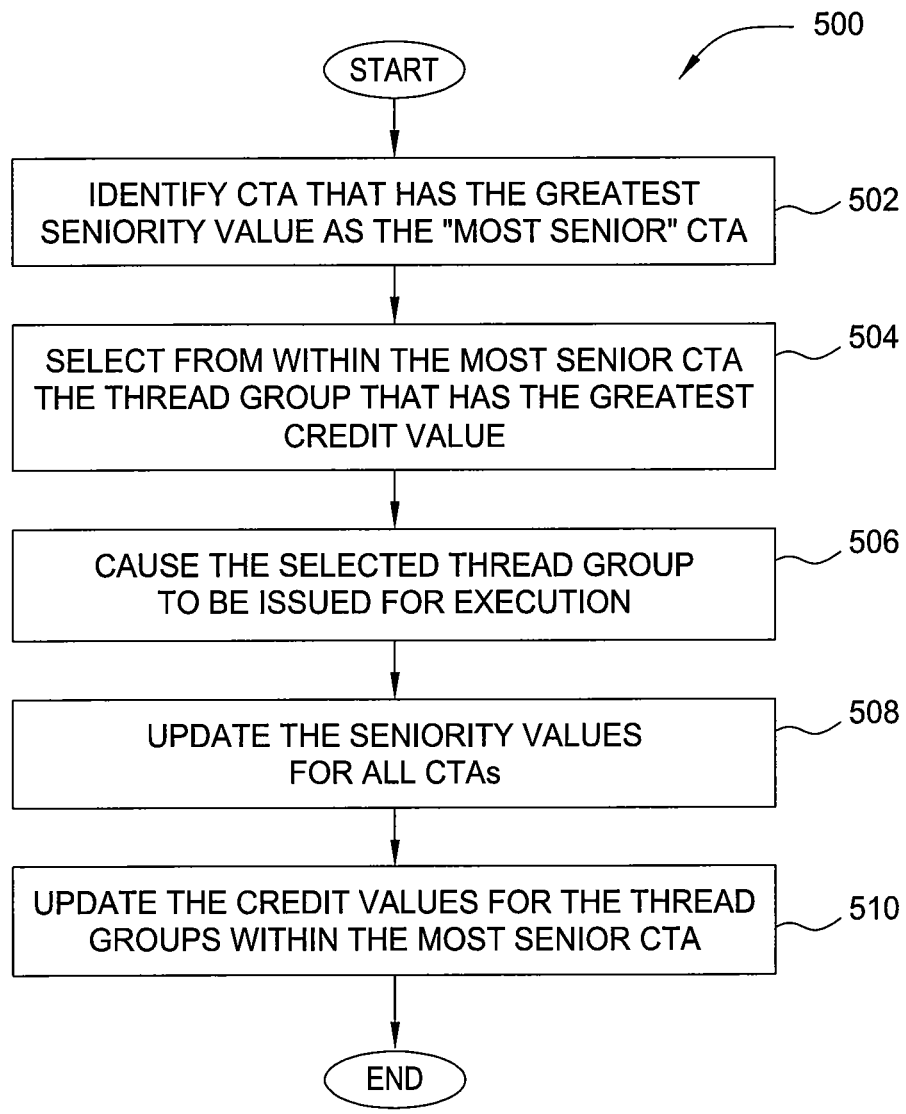
FIG. 5 is a flowchart of method steps for selecting a thread group to issue for execution, according to one embodiment of the invention.

FIG. 5 is a flowchart of method steps for selecting a thread group to issue for execution, according to one embodiment of the invention. The instruction scheduler 312 performs the method 500 at each cycle in order to select a thread group from the pool of available thread groups to issue for execution during the subsequent cycle. Persons skilled in the art will understand that, although the method 500 is described in conjunction with the systems of FIG. 1-3C, any system configured to perform the method steps, in any order, is within the scope of the present invention.

As shown, the method 500 begins at step 502, where the instruction scheduler 312 identifies the "most senior" CTA, which is the CTA having the greatest seniority value. The instruction scheduler 312 is configured to identify the most senior CTA from those CTAs that include one or more thread groups from the pool of available thread groups identified via the method 400, discussed above in conjunction with FIG. 4. As previously described, the seniority value of a given CTA may refer to the amount of time elapsed since the CTA was initially launched, i.e. the age of the CTA. However, as further discussed below, instruction scheduler 312 is configured to increase or decrease the seniority values of the various CTAs within the SMP 310, and so the seniority value of a given CTA may not necessarily reflect the actual age of that CTA.

At step 504, the instruction scheduler 312 selects from within the most senior CTA the thread group that has the greatest credit value. The credit value associated with a given thread group reflects the progress of the threads within the thread group towards completing processing tasks assigned to those threads. In one embodiment, the instruction scheduler 312 selects S thread groups having the S highest credit values to issue for execution.

At step 506, the instruction scheduler 312 causes the thread group that has the highest credit value to be issued for execution during the subsequent cycle. At the subsequent cycle, the SMP 310 executes the threads within the selected thread group using the exec units 302 and the LSUs 303, as well as various different memory units within the SMP 310 and/or external to the SMP 310. In embodiments where S thread groups are selected, the instruction scheduler 312 causes the S thread groups to be issued for execution at step 506.

At step 508, the instruction scheduler 312 updates the seniority values associated with each CTA within the SMP 310. In one embodiment, the instruction scheduler 312 updates the seniority values by incrementing each seniority value. In another embodiment, the instruction scheduler 312 updates the seniority values by "rotating" those seniority values, so that each CTA takes on the seniority value of a different CTA. In doing so, the instruction scheduler 312 causes the most senior CTA to assume the seniority value of the least senior CTA, and then causes each of the other CTAs to assume the seniority value associated with the next-most senior CTA. In yet another embodiment, each of the seniority values is constrained to a valid range depending on, e.g., the size of a hardware register used to store the seniority value. If a given seniority value exceeds the valid range, then the instruction scheduler 312 may reset that seniority value.

For example, the seniority values for CTAs 1, 2, and 3 could be 1000, 100, and 10, respectively. After the instruction scheduler 312 rotates those seniority values, CTAs 1, 2, and 3 would have seniority values of 10, 1000, and 100, respectively. Each CTA may include a pointer to a hardware register storing the seniority value for that CTA. When rotating seniority values, the instruction scheduler 312 may increment or reset the pointer associated with the CTA. In yet another embodiment, the instruction scheduler 312 increments the seniority values during certain cycles and rotates the seniority values during other cycles. For example, the instruction scheduler 312 could rotate the seniority values every third cycle and increment the seniority values during the other cycles.

At step 510, the instruction scheduler 312 updates the credit values associated with each thread group within the most senior CTA. The instruction scheduler 312 may increase the credit value of a given thread group when that thread group is not issued for execution during a particular cycle. For example, the instruction scheduler 312 could increment the credit value associated with the thread group when that thread group is not issued for execution. Conversely, the instruction scheduler 312 may decrease the credit value of a thread group when that thread group is issued for execution. For example, the instruction scheduler 312 could divide the credit value by an integer, such as two. In one embodiment, the instruction scheduler 312 does not update credit values associated with thread groups that are not issuable. In another embodiment, the instruction scheduler 312 updates the credit values associated with all of the thread groups within the SMP 310.

In sum, an instruction scheduler selects a thread group to issue for execution by (i) identifying a pool of available thread groups, (ii) sorting the available thread groups based on a seniority value associated with the CTA to which each thread group belongs, and (iii) identifying the thread group that has the highest credit value within the "most senior" CTA.

Advantageously, SMP resources typically are not consumed by a single CTA executing just one remaining thread, because selecting thread groups based on associated credit values ensures that each thread group within the CTA completes at approximately the same time. Furthermore, selecting a thread group for execution based on the seniority value of an associated CTA, and then updating the seniority values of each different CTA will, in practice, allow thread groups from each different CTA to be issued for execution. Consequently, the SMP will execute a greater variety of different instruction types associated with thread groups from the different CTAs, thereby making more efficient use of processing resources. In addition, selecting a thread group for execution based on continuously updated seniority values ensures that CTAs exit at different times, thereby preventing the SMP from sitting idle while new CTAs are launched. Finally, periodically rotating the seniority values ensures that a single high-seniority value CTA does not consume all SMP resources while waiting for low-seniority value CTAs to complete. Accordingly, deadlock may be avoided in situations where the low-seniority value CTAs require resources held by the high-seniority value CTA.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for scheduling thread groups for execution on a parallel processing unit configured to process a plurality of currently launched cooperative thread arrays (CTAs), the method comprising:
   identifying a pool of thread groups from the plurality of currently launched CTAs, wherein each thread group in the pool of thread groups is available and can be issued for execution on the parallel processing unit;
   identifying a first CTA within the plurality of currently launched CTAs based on a seniority value that reflects an amount of time elapsed since the first CTA was launched; and
   selecting from within the first CTA a first thread group to be issued for execution on the parallel processing unit based on a credit value that reflects an amount of processing operations completed by the first thread group.

2. The computer-implemented method of claim 1, further comprising causing the first thread group to be issued for execution on the parallel processing unit.

3. The computer-implemented method of claim 1, wherein each CTA within the plurality of currently launched CTAs is associated with a seniority value, and further comprising updating the seniority value associated with each of the CTAs within the plurality of currently launched CTAs based on a current cycle of the parallel processing unit.

4. The computer-implemented method of claim 3, wherein updating the seniority values associated with the CTAs within the plurality of currently launched CTAs comprises:
   determining based on the current cycle of the parallel processing unit that the seniority values associated with the CTAs within the plurality of currently launched CTAs should be incremented; and
   incrementing the seniority value associated with each of the CTAs within the plurality of currently launched CTAs.

5. The computer-implemented method of claim 3, wherein each of the CTAs within the plurality of currently launched CTAs includes a pointer to a register that stores a seniority value associated with the CTA, and wherein updating the seniority values associated with the CTAs within the plurality of currently launched CTAs comprises:
   determining based on the current cycle associated with the parallel processing unit that the seniority values associated with the CTAs within the plurality of currently launched CTAs should be rotated; and
   rotating the seniority value associated with each of the CTAs within the plurality of currently launched CTAs by incrementing the pointer included in each of the CTAs other than the first CTA, and resetting the pointer included in the first CTA.

6. The computer-implemented method of claim 1, further comprising updating the credit values associated with one or more thread groups within the first CTA by:
   dividing the credit value associated with the first thread group by two; and
   incrementing credit values associated with other thread groups within the first CTA.

7. The computer-implemented method of claim 1, wherein identifying the pool of thread groups that are available to be issued for execution on the parallel processing unit comprises identifying thread groups that (i) are not stalled by a hardware-imposed latency, (ii) are not stalled by a math or memory latency, and (iii) are not stalled by a synchronization latency.

8. A non-transitory computer-readable medium including instructions that, when executed by a processing unit, cause the processing unit to schedule thread groups for execution on a parallel processing unit configured to process a plurality of currently launched cooperative thread arrays (CTAs), by performing the steps of:
   identifying a pool of thread groups from the plurality of currently launched CTAs, wherein each thread group in the pool of thread groups is available and can be issued for execution on the parallel processing unit;
   identifying a first CTA within the plurality of currently launched CTAs based on a seniority value that reflects an amount of time elapsed since the first CTA was launched; and
   selecting from within the first CTA a first thread group to be issued for execution on the parallel processing unit based on a credit value that reflects an amount of processing operations completed by the first thread group.

9. The non-transitory computer-readable medium of claim 8, further comprising the step of causing the first thread group to be issued for execution on the parallel processing unit.

10. The non-transitory computer-readable medium of claim 8, wherein each CTA within the plurality of currently launched CTAs is associated with a seniority value, and further comprising the step of updating the seniority value associated with each of the CTAs within the plurality of currently launched CTAs based on a current cycle of the parallel processing unit.

11. The non-transitory computer-readable medium of claim 10, wherein the step of updating the seniority values associated with the CTAs within the plurality of currently launched CTAs comprises:
   determining based on the current cycle of the parallel processing unit that the seniority values associated with the CTAs within the plurality of currently launched CTAs should be incremented; and
   incrementing the seniority value associated with each of the CTAs within the plurality of currently launched CTAs.

12. The non-transitory computer-readable medium of claim 10, wherein each of the CTAs within the plurality of currently launched CTAs includes a pointer to a register that stores a seniority value associated with the CTA, and wherein the step of updating the seniority values associated with the CTAs within the plurality of currently launched CTAs comprises:
   determining based on the current cycle associated with the parallel processing unit that the seniority values associated with the CTAs within the plurality of currently launched CTAs should be rotated; and rotating the seniority value associated with each of the CTAs within the plurality of currently launched CTAs by incrementing the pointer included in each of the CTAs other than the first CTA, and resetting the pointer included in the first CTA.

13. The non-transitory computer-readable medium of claim 8, further comprising the step of updating the credit values associated with one or more thread groups within the first CTA by:
dividing the credit value associated with the first thread group by two; and
incrementing credit values associated with other thread groups within the first CTA.

14. The non-transitory computer-readable medium of claim 8, wherein the step of identifying the pool of thread groups that are available to be issued for execution on the parallel processing unit comprises identifying thread groups that (i) are not stalled by a hardware-imposed latency, (ii) are not stalled by a math or memory latency, and (iii) are not stalled by a synchronization latency.

15. A computing device configured to schedule thread groups for execution on a parallel processing unit that is configured to process a plurality of currently launched cooperative thread arrays (CTAs), the computing device comprising:
a scheduling unit configured to:
identify a pool of thread groups from the plurality of currently launched CTAs, wherein each thread group in the pool of thread groups is available and can be issued for execution on the parallel processing unit;
identify a first CTA within the plurality of currently launched CTAs based on a seniority value that reflects an amount of time elapsed since the first CTA was launched; and
select from within the first CTA a first thread group to be issued for execution on the parallel processing unit based on a credit value that reflects an amount of processing operations completed by the first thread group.

16. The computing device of claim 15, wherein each CTA within the plurality of currently launched CTAs is associated with a seniority value, and wherein the scheduling unit is further configured to update the seniority value associated with each of the CTAs within the plurality of currently launched CTAs based on a current cycle of the parallel processing unit.

17. The computing device of claim 16, wherein the seniority values associated with the CTAs within the plurality of currently launched CTAs are updated by either (i) incrementing the seniority value associated with each of the CTAs within the plurality of currently launched CTAs, or (ii) incrementing a pointer included in each of the CTAs, other than a pointer included in the first CTA, and resetting the pointer included in the first CTA.

18. The computing device of claim 15, wherein the scheduling unit is further configured to update the credit values associated with one or more thread groups within the first CTA by:
dividing the credit value associated with the first thread group by two; and
incrementing credit values associated with other thread groups within the first CTA.

19. The computing device of claim 15, wherein the scheduling unit is configured to update the pool of thread groups that are available to be issued for execution on the parallel processing unit by identifying thread groups that (i) are not stalled by a hardware-imposed latency, (ii) are not stalled by a math or memory latency, and (iii) are not stalled by a synchronization latency.

20. The computing device of claim 15, wherein each of the CTAs within the plurality of currently launched CTAs includes a pointer to a register that stores a seniority value associated with the CTA, and wherein updating the seniority values associated with the CTAs within the plurality of currently launched CTAs comprises:
determining based on the current cycle associated with the parallel processing unit that the seniority values associated with the CTAs within the plurality of currently launched CTAs should be rotated; and
rotating the seniority value associated with each of the CTAs within the plurality of currently launched CTAs by incrementing the pointer included in each of the CTAs other than the first CTA, and resetting the pointer included in the first CTA.

* * * * *

UNITED STATES PATENT AND TRADEMARK OFFICE
CERTIFICATE OF CORRECTION

PATENT NO. : 8,732,713 B2  Page 1 of 1
APPLICATION NO. : 13/247819
DATED : May 20, 2014
INVENTOR(S) : Coon et al.

It is certified that error appears in the above-identified patent and that said Letters Patent is hereby corrected as shown below:

Title Page, Inventors item (75):

Please insert --deceased-- after John R. Nickolis.

Signed and Sealed this
Fifth Day of August, 2014

Michelle K. Lee
*Deputy Director of the United States Patent and Trademark Office*